United States Patent
Atluru et al.

(10) Patent No.: US 12,520,015 B2
(45) Date of Patent: Jan. 6, 2026

(54) DUAL STREAM DYNAMIC GOP ACCESS BASED ON VIEWPORT CHANGE

(71) Applicant: Dolby Laboratories Licensing Corporation, San Francisco, CA (US)

(72) Inventors: Chaitanya Atluru, San Jose, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/019,729

(22) PCT Filed: Aug. 3, 2021

(86) PCT No.: PCT/US2021/044379
§ 371 (c)(1),
(2) Date: Feb. 3, 2023

(87) PCT Pub. No.: WO2022/031727
PCT Pub. Date: Feb. 10, 2022

(65) Prior Publication Data
US 2023/0300426 A1    Sep. 21, 2023

Related U.S. Application Data

(60) Provisional application No. 63/060,269, filed on Aug. 3, 2020.

(30) Foreign Application Priority Data

Aug. 3, 2020    (EP) ................................... 20189126

(51) Int. Cl.
*H04N 7/16*    (2011.01)
*H04N 21/81*    (2011.01)

(52) U.S. Cl.
CPC ............................... *H04N 21/816* (2013.01)

(58) Field of Classification Search
CPC ............... H04N 21/816; H04N 19/597; H04N 21/21805; H04N 21/23439;
(Continued)

(56) References Cited

U.S. PATENT DOCUMENTS

| 6,611,624 B1 | 8/2003 | Zhang |
| 6,788,333 B1 * | 9/2004 | Uyttendaele ............. G06T 7/80 348/42 |

(Continued)

FOREIGN PATENT DOCUMENTS

| CN | 101953164 A | 1/2011 |
| CN | 110024409 B | 8/2021 |

(Continued)

OTHER PUBLICATIONS

ISO/IEC 13818-2:2013 "Information technology-Generic Coding of Moving Pictures and Associated Audio Information—Part 2-Video" Oct. 2013.

(Continued)

*Primary Examiner* — Annan Q Shang

(57) ABSTRACT

A multi-view image stream encoded with primary and secondary image is accessed. Each primary image stream comprises groups of pictures (GOPs). Each secondary image stream comprises I-frames generated from a corresponding primary image stream. Viewpoint data collected in real time is received from a recipient decoding device to indicate that the viewer's viewpoint has changed from a specific time point. A camera is selected based on the viewer's changed viewpoint. It is determined whether the specific time point corresponds to a non-I-frame in a GOP of a primary image stream of the selected camera. If so, an I-frame from a secondary image stream corresponding to the primary image stream is transmitted to the recipient decoding device.

13 Claims, 6 Drawing Sheets

(58) Field of Classification Search
CPC ........... H04N 21/2387; H04N 21/2662; H04N 21/44016; H04N 21/845; H04N 21/8451; H04N 21/8456
See application file for complete search history.

(56) References Cited

U.S. PATENT DOCUMENTS

| | | | |
|---|---|---|---|
| 6,871,006 B1 | 3/2005 | Oguz | |
| 8,095,955 B2 | 1/2012 | Hardacker | |
| 9,961,323 B2 | 5/2018 | Choi | |
| 10,368,075 B2 | 7/2019 | Good | |
| 10,432,970 B1 | 10/2019 | Phillips | |
| 10,715,843 B2* | 7/2020 | Van Brandenburg | H04N 21/23439 |
| 2006/0026646 A1* | 2/2006 | Lou | G11B 27/105 725/135 |
| 2007/0174880 A1 | 7/2007 | Fite | |
| 2009/0201992 A1 | 8/2009 | Seo | |
| 2010/0036964 A1 | 2/2010 | Cedervall | |
| 2013/0117796 A1 | 5/2013 | Qi | |
| 2015/0271401 A1* | 9/2015 | Khoury | H04N 23/661 348/36 |
| 2015/0319424 A1* | 11/2015 | Haimovitch-Yogev | H04N 23/661 348/48 |
| 2016/0050434 A1 | 2/2016 | Lundberg | |
| 2016/0065947 A1* | 3/2016 | Cole | H04N 13/139 348/43 |
| 2017/0064329 A1 | 3/2017 | Lawrence | |
| 2017/0163683 A1 | 6/2017 | Van Den Berghe | |
| 2018/0176535 A1 | 6/2018 | Ninan | |
| 2018/0255362 A1 | 9/2018 | Chittella | |
| 2019/0174125 A1 | 6/2019 | Ninan | |
| 2019/0208231 A1* | 7/2019 | Kitasei | H04L 65/762 |
| 2019/0332866 A1* | 10/2019 | Beall | G06T 17/30 |
| 2019/0387237 A1 | 12/2019 | Phillips | |
| 2020/0236278 A1* | 7/2020 | Yeung | H04N 21/2187 |
| 2021/0390964 A1* | 12/2021 | Keiler | G10L 19/008 |
| 2023/0215129 A1* | 7/2023 | Ninan | G06T 7/20 382/190 |
| 2023/0224447 A1* | 7/2023 | Ward | H04N 19/46 348/43 |

FOREIGN PATENT DOCUMENTS

| | | |
|---|---|---|
| CN | 109996055 B | 8/2022 |
| CN | 111355954 B | 10/2022 |
| EP | 3367626 A1 | 8/2018 |
| EP | 3516882 B1 | 10/2020 |
| EP | 3454566 A1 | 5/2021 |
| JP | 2008521363 A | 6/2008 |
| WO | 2002011517 A2 | 2/2002 |
| WO | 2017123474 A1 | 7/2017 |
| WO | 2017140946 A1 | 8/2017 |
| WO | 2018005835 A1 | 1/2018 |
| WO | 2018125590 A1 | 7/2018 |

OTHER PUBLICATIONS

ISO/IEC 14496-2 Information Technology—Coding of Audio-Visual Object Part 2, Visual Dec. 2001.

ITU-1 H.264 "Advanced Video Coding for Generic Audiovisual Services" Series H: Audiovisual and Multimedia Systems, Infrastructure of Audiovisual services—Coding of Moving Video, Jun. 2019.

ITU-1 H.265 "High Efficiency Video Coding" Series H: Audiovisual and Multimedia systems, Infrastructure of Audiovisual Services—Coding of Moving Video, Nov. 2019.

ITU-T. H.262 "Information Technology—Generic Coding of Moving Pictures and Associated Audio Information: Video" Jul. 1995. Transmission of Non-Telephone Signals.

Maugey, T. et al."Navigation Domain Representation for Interactive Multiview Imaging" IEEE Transactions on Image Processing, vol. 22, No. 9, Sep. 2013, pp. 3459-3472.

* cited by examiner

DUAL STREAM DYNAMIC GOP ACCESS BASED ON VIEWPORT CHANGE

CROSS-REFERENCE TO RELATED APPLICATIONS

This application claims priority to U.S. provisional patent application No. 63/060,269 and EP patent application EP20189126.4, both filed 3 Aug. 2020.

TECHNOLOGY

The present invention relates generally to image coding and rendering, and in particular, to video codec.

BACKGROUND

Video coding standards such as Moving Picture Experts Group 1 (MPEG-1) Video, MPEG-2 Video, MPEG-4 Visual, H.264/Advanced Video Coding (H.264/AVC), High-Efficiency Video Coding (HEVC), or the like, have been developed over time to compress and stream relatively high quality video at a relatively low bit rate.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
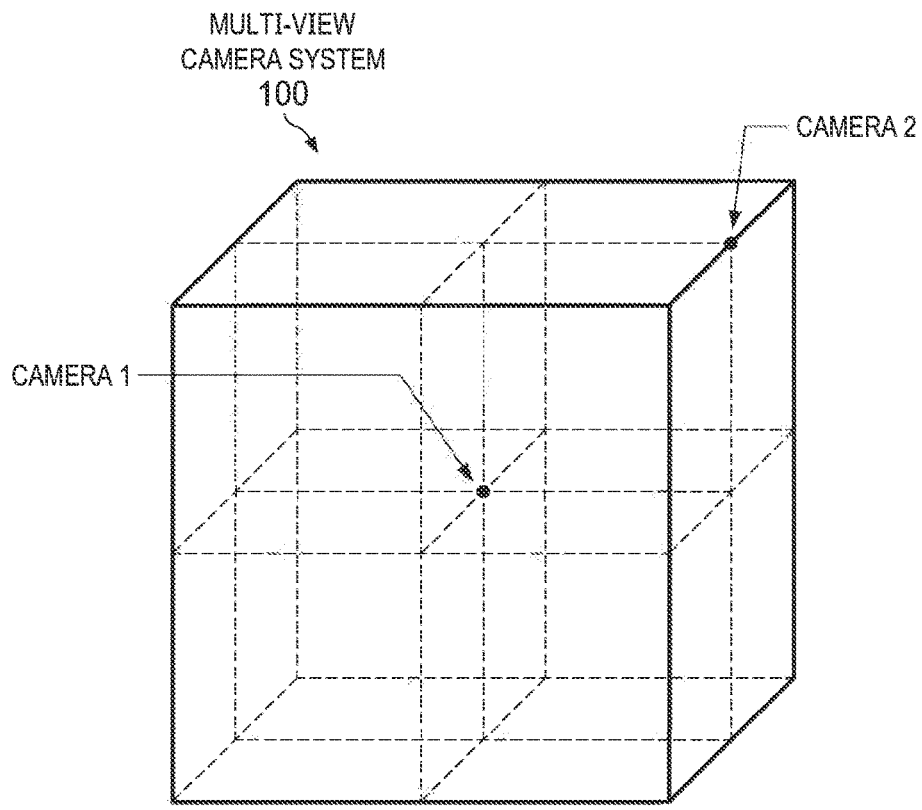
FIG. 1A illustrates an example multi-view camera system.

Example embodiments, which relate to dual stream dynamic group of pictures (GOP) access based on viewport change, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. GENERAL OVERVIEW
2. MULTI-VIEW IMAGE STREAM AND CAMERA SYSTEM
3. VIEWING VOLUME AND REAL TIME VIDEO STREAMING
4. EXAMPLE VIDEO STREAMING DEVICES
5. EXAMPLE PROCESS FLOWS
6. IMPLEMENTATION MECHANISMS—HARDWARE OVERVIEW
7. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

For AR, VR or volumetric video streaming, video images captured from a plurality of cameras of different camera positions and/or different camera orientation can be warped to create images of a desired viewpoint to be rendered in a viewer's viewport. To save bandwidth usage in video streaming, only image data captured from a relatively small subset in the plurality of cameras (e.g., one or more "N" nearest cameras in relation to the desired viewpoint, etc.) may be transmitted to create the warped images of the desired viewpoint to be rendered in the viewer's viewport. When the viewer's position or orientation changes, image data captured from a different relatively small subset in the plurality of cameras is needed to create warped images of a different viewpoint corresponding to the viewer's changed position or orientation.

To further save bandwidth usage in video streaming, an image stream generated with each camera in the plurality of cameras can be encoded in a GOP structure that eliminates or reduces data redundancy through intra or inter predictive coding within or among images in the same GOP. Each GOP in the image stream contains a specific ordered arrangement of I-, P-, and B-frames.

A GOP may be constructed from a group of consecutive source or input images such as camera-generated (e.g., physical camera generated, virtual camera generated, etc.) images captured with physical camera or virtual camera implemented with computing devices. An image in the GOP such as an P-frame or I-frame may comprise prediction units comprising image data in which data redundancy in a corresponding source or input image has been reduced or removed through inter- or intra-predictive operations. A group of reconstructed images may be constructed or reconstructed from the GOP. Each reconstructed image in the group of reconstructed images may correspond to a respective frame/image in the GOP, and may be constructed or reconstructed by performing inverse operations to the inter- or intra-predictive operations used to compress the input or source images into the GOP. Each reconstructed image in the group of reconstructed images represents or (e.g., closely, etc.) approximates a corresponding image among the input or source images used to generate the GOP.

The viewer in an AR, VR or volumetric video application may make head or body motions to change positions or orientations from time to time and to expect images corresponding to the changed positions or orientations to render in the viewer's viewport. Viewport changes caused by the viewer changing positions and orientations may or may not coincide with GOP boundaries.

Under other approaches that do not implement techniques as described herein, switching artifacts can be introduced. For example, if image data from I-frame or an instantaneous decoder refresh picture (e.g., clean random access picture, broken link access picture, or the like) of a GOP in an image stream of a camera of a previous position and orientation were used to perform predictive coding operations with non-I-frames in the middle of a different GOP of a different image stream of a different camera selected based on the viewer's current changed position and orientation, then image qualities of resultant images could suffer greatly. Alternatively, if the switch to the image stream of the different camera were delayed to the next GOP boundary in the image stream of the different camera, then a time lag between a first time when the viewer's position or orientation had changed and a second subsequent time when images corresponding to the viewer's changed position or orientation was rendered could be readily noticed by the viewer.

One way to overcome these problems could be to (e.g., always, mostly, etc.) use only I-Frames for all image streams. This could make switching cameras based on the viewer's positions or orientation relatively easy; however, given that a large number of I-frames-only image streams would be needed for supporting position-specific or orientation image rendering, this approach could become an extremely costly operation with respect to bandwidth usage.

Techniques as described herein can be used to support dynamic access to a group of pictures (GOP) in any of multiple image streams of multiple cameras in response to viewport changes with significant bandwidth efficiency and with no or little visual artifacts.

Under these techniques, a respective primary image stream that implements a GOP structure may be generated for each camera among multiple cameras with different camera positions or different camera orientations. As a result, multiple primary image streams are generated for the multiple cameras.

For each primary image stream of the multiple primary image streams with GOP structures, a respective secondary image stream is created as an I-frame only stream. I-frames in the secondary image stream are not created using original (e.g., source, raw, uncompressed, etc.) image frames captured by the camera and used to give rise to the primary image stream, but rather I-frames derived from reconstructed I-, P- and B-frames in the primary image stream. In some operational scenarios, original or source images (e.g., before applying prediction operations, etc.) are not directly used as I-frames in the secondary image stream. Reconstructed images are used to create I-frames in the secondary image stream for the purpose of reducing the amount of accumulated or additive error losses in reference with image data in the primary image stream. Additionally, optionally or alternatively, in some operational scenarios, original or source frames before applying prediction operations may be used directly to derive I-frames to be included in the secondary image stream. A secondary image stream comprising I-frame not reconstructed from the primary image stream but constructed from original (e.g., source, raw, etc.) images may produce some artifact induced (or artifact visible) frames as is on the decoder-side. However, such artifacts can be rectified or ameliorated at least to a significant degree using image processing algorithms. This approach may compromise some quality loss for latency and allow fast switching between streams with some remaining artifacts with or without remedy image processing algorithm.

For each camera in the plurality of cameras, a dual bitstream structure is formed by a corresponding primary image stream comprising GOP images generated from image data captured by the camera and a corresponding secondary image stream comprising reconstructed I-frames from the GOP images of the corresponding primary image stream. A plurality of dual bitstream structures can be formed for the plurality of cameras to allow or enable a video streaming server to perform just-in-time image data streaming operations and a video streaming client to perform intelligent rendering operations based on streamed image data.

The dual bitstream structures comprising primary and secondary image streams can be used to dynamically switch images in a viewer's viewport to different viewpoints. Even if a switch occurs within a GOP comprising I-, P- and/or B-frames, the dual bitstream structures can be used to maintain (integrity of) the GOP structure of the GOP and to allow non-I-frames in the GOP to be interpreted in predictive coding operations with a correct coding context.

When a switch of image streams among different cameras happens inside a GOP, the video streaming client such as a video decoder will receive reconstructed I-frame(s) from a secondary image stream, followed by subsequent non I-frames in a corresponding primary image stream. The video decoder can use the earlier received reconstructed I-frame(s) from the secondary image stream to set up correct coding contexts to perform image processing operations such as predictive coding operations with respect to the subsequent non-I-frames from the primary image stream.

More specifically, in response to a viewport switch that occurs within a GOP of a primary image stream of a newly selected camera, an upstream device such as a video streaming server (e.g., immediately, next, etc.) sends, to a video recipient device such as a video decoder, a reconstructed I-frame of a corresponding secondary image stream to the primary image stream. The reconstructed I-frame of the secondary image stream corresponds to a non-I-frame in the primary image stream at (the time of) the viewport switch, and is followed in the video streaming with subsequent P- and/or B-frames in the GOP of the primary image stream.

The recipient device receives the reconstructed I-frame from the secondary image stream, sets a corresponding coding context based on the reconstructed I-frame for coding subsequent frames, receives the subsequent P- and/or B-frames in the GOP, and uses the coding context set up with the reconstructed I-frame to decode the subsequent P- and/or B-frames in the GOP and to generate or reconstruct images for rendering to the viewer.

When a primary image stream as described herein is encoded, residual data in a non-I-frame of a GOP in the primary image stream may generated based at least in part on the state (e.g., SNR, PSNR, noise, quantization/coding errors, arithmetic encoding states, etc.) of the (e.g., immediately, within the GOP, etc.) preceding frame. As each reconstructed I-frame in the secondary image stream is reconstructed from a corresponding non-I-frame as well as preceding I- and non-I-frame(s) in the same GOP of the primary image stream, the states (e.g., SNR, PSNR, noise, quantization/coding errors, arithmetic encoding states, etc.) of the corresponding non-I frame as well as the preceding frame(s) are (e.g., correctly, etc.) accumulated and propagated to the reconstructed I-frame. As a result, the reconstructed I-frame can be used by the video decoder to set up correct coding contexts (or states) to decode the subsequent non-I-frames in the primary image stream. As a result, images generated or derived by the video decoder from the reconstructed I-frame(s) and the subsequent non-I-frames have a consistent correlated level of image quality.

By way of comparison, an I-frame that is directly constructed from image data captured by a camera may be of image quality of a different level from that of a reconstructed I-frame that has gone through the same preceding path as in a GOP from which the reconstructed I-frame is derived. Thus, even if the I-frame directly constructed from image data captured by the camera were sent to the video decoder, the video decoder would not obtain correct coding contexts in reconstructing images from subsequent non-I-frames in the GOP. As a result, visual artifact as well as inconsistent image quality levels can be visually perceived by the viewer.

Example embodiments described herein relate to providing video stream data. A multi-view image stream encoded with a plurality of primary image streams and a plurality of secondary image streams is accessed. Each primary image stream in the plurality of primary image streams comprises groups of pictures (GOPs). Each secondary image stream in the plurality of secondary image streams comprises reconstructed I-frames generated from a corresponding primary image stream in the plurality of primary image streams. Viewpoint data of a viewer collected in real time while the viewer is viewing video content derived from a subset of image data in the multi-view image stream is received from a recipient decoding device. The viewpoint data indicates the viewer's viewpoint has changed starting from a specific time point. A camera is selected, based on the viewer's changed viewpoint, from among the plurality of cameras. A video content portion derived from an image data portion captured by the selected camera is to be rendered in the viewer's viewport after the specific time point. It is determined whether the specific time point corresponds to a non-I-frame in a GOP of a primary image stream in connection with the selected camera. In response to determining that the specific time point corresponds to a non-I-frame in a GOP of a primary image stream in connection with the selected camera, a reconstructed I-frame from a secondary image stream corresponding to the primary image stream in connection with the selected camera is transmitted to the recipient decoding device.

Example embodiments described herein relate to rendering video stream data. Video content derived from a subset of image data in a multi-view image stream encoded with a plurality of primary image streams and a plurality of secondary image streams is received from an upstream device. Each primary image stream in the plurality of primary image streams comprises groups of pictures (GOPs). Each secondary image stream in the plurality of secondary image streams comprises reconstructed I-frames generated from a corresponding primary image stream in the plurality of primary image streams. Viewpoint data of a viewer collected in real time while the viewer is viewing the video content is sent to the upstream device. The viewpoint data indicates the viewer's viewpoint has changed starting from a specific time point. A camera is selected, based on the viewer's changed viewpoint, from among the plurality of cameras. A video content portion derived from an image data portion captured by the selected camera is to be rendered in the viewer's viewport after the specific time point. The specific time point corresponds to a non-I-frame in a GOP of a primary image stream in connection with the selected camera. A reconstructed I-frame from a secondary image stream corresponding to the primary image stream in connection with the selected camera is received from the upstream device. The reconstructed I-frame is processed and rendered in the viewer's viewpoint for the specific time point.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Multi-View Image Stream and Camera System

A multi-view image stream as described herein comprises a sequence of multi-view images. Image data derived from a multi-view image in the sequence of multi-view images of the multi-view image stream is to be rendered to a viewer at a time point in a sequence of time points over a time interval/duration in a video application. Example video applications include, but are not necessarily limited to only, any of: an AR application, a VR application, a volumetric video application, an immersive video application, a 360 degree video application, and so forth.

The multi-view image stream may be generated by an upstream device such as a multi-view video encoder from multiple (e.g., original, source, uncompressed, raw etc.) individual single-view image streams of multiple cameras of multiple different camera positions and/or camera orientations.

FIG. 1A illustrates an example multi-view camera system comprising a plurality of cameras for capturing individual single-view image streams from a plurality of different camera positions and/or a plurality of camera orientations. By way of example but not limitation, the plurality of cameras may be located at a plurality of vertices (or grid points) of a 3-dimensional (3D) grid in a spatial volume.

Camera 1 among the plurality of cameras may be located at a first camera position or a first camera orientation—in the plurality of different camera positions and/or the plurality of different camera orientations—corresponding to a first camera position and/or a first camera orientation such as the central vertex (or grid point) of the 3D grid. A first sequence of individual single-view images captured or acquired by Camera 1 may be used to generate a first single-view image stream. Similarly, Camera 2 among the plurality of cameras may be located at a second different camera position or a second different camera orientation—in the plurality of different camera positions and/or the plurality of different camera orientations—corresponding to a second different camera position and/or a second different camera orientation such as an upper-left vertex (or grid point) of the 3D grid. A second sequence of individual single-view images captured or acquired by Camera 2 may be used to generate a second single-view image stream.

A multi-view image in the multi-view image stream corresponding to (e.g., to be rendered to a viewer at, etc.) a time point in a sequence of time points may be generated or derived from a corresponding plurality of individual single-view images acquired by the plurality of cameras. Each individual single-view image in the corresponding plurality of individual single-view images may be derived by a respective camera in the plurality of cameras. For example, the corresponding plurality of individual single-view images may include a first individual single-view image in the first sequence of individual single-view images of the first single-view image stream generated with the first camera, a second individual single-view image in the second sequence of individual single-view images of the second single-view image stream generated with the second camera, and so forth.

Figure 1B:
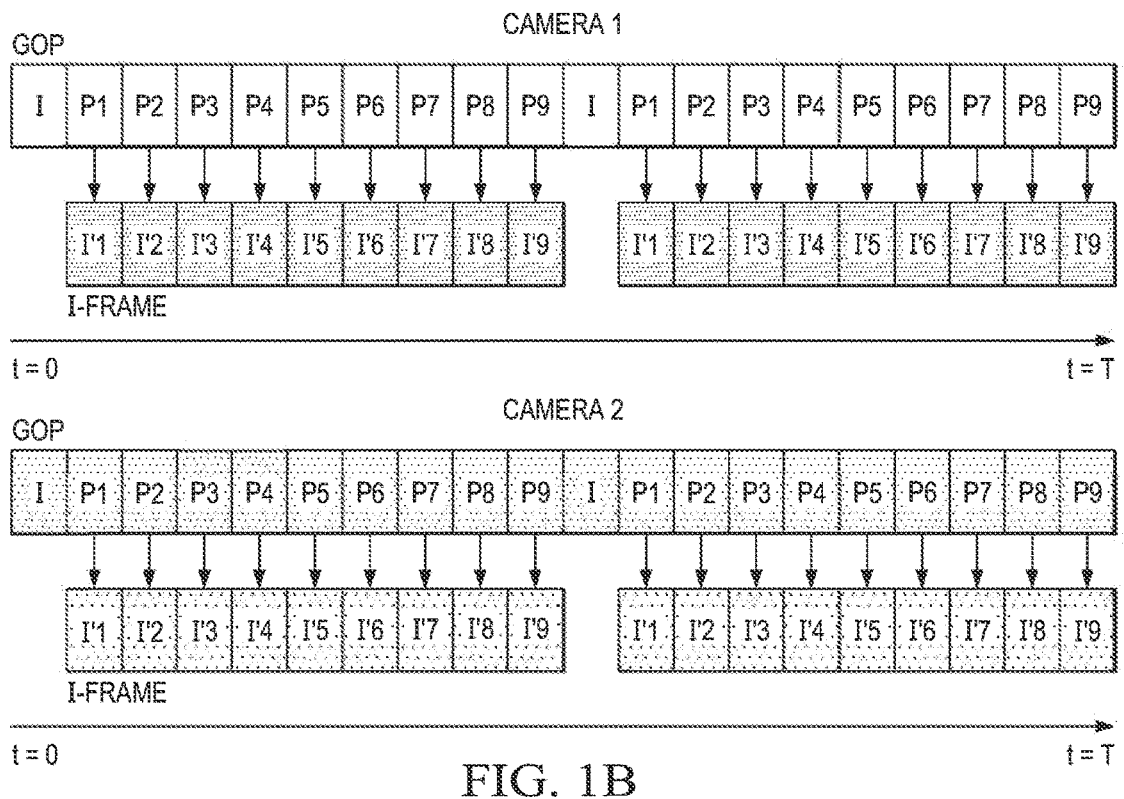
FIG. 1B and FIG. 1C illustrate example dual bitstream structures.

FIG. 1B illustrates example dual bitstream structures for Camera 1 and Camera 2 (e.g., as shown in FIG. 1A, etc). A dual bitstream structure such as illustrated in FIG. 1B may be implemented for image data generated with each camera in a plurality of cameras of a multi-view camera system (e.g., 100 of FIG. 1A, etc.) used to generate a multi-view video stream.

A first dual bitstream structure for image data generated with Camera 1 comprises a first primary image stream (denoted as "GOP") that implements a first GOP structure and a secondary image stream (denoted as "I-Frame") that comprises reconstructed I-frames derived from the first primary image stream.

The first GOP structure of the first primary image stream generated with Camera 1 comprises a first sequence of images that are consecutively partitioned into two GOPs. The first sequence of images corresponds to, or is indexed with, a sequence of time points beginning at t=0 and ending at t=T over a time interval/duration of T (unit time). Each of the two GOPs in the first GOP structure of the first primary image stream generated with Camera 1 comprises a sub-sequence of images that begins with an I-frame (denoted as "I"), which is then followed by nine P-frames (respectively denoted as "P1", "P2", . . . "P9").

The secondary image stream in connection with Camera 1 comprises a first sequence of reconstructed I-frames each of which is derived from a corresponding non-I-Frame of all non-I frames in the first primary image stream. As illustrated in FIG. 1B, the secondary image stream in connection with Camera 1 comprises two sub-sequences of reconstructed I-frames. The two sub-sequences of reconstructed I-frames in the secondary image stream in connection with Camera 1 correspond to two GOPs, respectively, in the first primary image stream generated with Camera 1.

Each sub-sequence of reconstructed I-frames in the two sub-sequences of reconstructed I-frames in connection with Camera 1 corresponds to a respective GOP of the GOPs in the first primary image stream generated with Camera 1. Each such sub-sequence of reconstructed I-frames comprises reconstructed I-frames (respectively denoted as "I'1", "I'2", . . . "I'9") generated from non-I-frames ("P1", "P2", . . . "P9") in the respective GOP.

As used herein, an I-frame is an image frame storing a complete image/picture or storing complete image data used to derive the complete image/picture. A P-frame is an image frame storing a change image/picture comprising only changes from one or more previous complete image/pictures. A B-frame is an image frame storing a change image/picture comprising only changes from both previous and succeeding complete image/pictures. Example descriptions relating to GOP, I-frame, P-frame, B-frame, etc. can be found in ISO/IEC 13818-2:2013, "Information Technology—Generic Coding of Moving Pictures and Associated audio information—Part 2: Video," (October 2013), which is incorporated herein by reference in its entirety.

For example, the I-frame denoted as I in the respective GOP of the first primary image stream generated with Camera 1 may contain or produce a complete image/picture without any reference to preceding or succeeding images/pictures. The I-frame I or the complete image/picture corresponding to or stored in the I-frame I may be buffered in a reference picture buffer as a part of coding context for decoding subsequent images/pictures after the I-frame is decoded from the first primary image stream.

The I-frame I and the P-frame P1 in the respective GOP of the first primary image stream generated with Camera 1 may be used to generate a reconstructed I-frame I'1. More specifically, the P-frame P1 stores only changes from the complete image/picture corresponding to or stored in the I-frame I. After the changes stored in the P-frame P1 are decoded from the first primary image stream generated with Camera 1, these changes can be added to (or subtracted from depending on the signs of the changes) the complete image/picture corresponding to or stored in the I-frame I to generate or construct the reconstructed I-frame I'1 comprising a complete image/picture corresponding to (but only the changes stored in) the P-frame P1. The reconstructed I-frame I'1 or the complete image/picture corresponding to the P-frame P1 may be buffered in the reference picture buffer as a part of updated coding context for decoding subsequent images/pictures after the P-frame P1 is decoded from the first primary image stream and after the reconstructed I-frame I'1 or the complete image/picture corresponding to the P-frame P1 is generated or constructed.

I, P1 and P2 (or I'1 and P2) in the respective GOP of the first primary image stream generated with Camera 1 may be used to generate a second reconstructed I-frame I'2. More specifically, the P-frame P2 stores only changes from a complete image/picture corresponding to either or both of the I-frame I and the P-frame P1. For the purpose of illustration only, the P-frame P2 stores only changes from the reconstructed I-frame I'1 or the complete image/picture corresponding to the P-frame P1. After the changes stored in the P-frame P2 are decoded from the first primary image stream generated with Camera 1, these changes can be added to (or subtracted from depending on the signs of the changes) the reconstructed I-frame I'1 or the complete image/picture corresponding to the P-frame P1 to generate or construct the second reconstructed I-frame I'2 comprising a complete image/picture corresponding to (but only the changes stored in) the P-frame P2. The second reconstructed I-frame I'2 or the complete image/picture corresponding to the P-frame P2 may be buffered in the reference picture buffer as a part of further updated coding context for decoding subsequent images/pictures after the P-frame P2 is decoded from the first primary image stream and after the second reconstructed I-frame I'2 or the complete image/picture corresponding to the P-frame P2 is generated or constructed.

I and P1 through Pi (or I'(i−1) and Pi), where i is any non-zero positive integer, in the respective GOP of the first primary image stream generated with Camera 1 may be used to generate a reconstructed I-frame I'i, in a similar manner as described above.

Similarly, a second dual bitstream structure for image data generated with Camera 2 comprises a second primary image stream (denoted as "GOP") that implements a second GOP structure and a secondary image stream (denoted as "I-Frame") that comprises reconstructed I-frames derived from the second primary image stream.

The second GOP structure of the second primary image stream generated with Camera 2 comprises a second sequence of images that are consecutively partitioned into two GOPs. The second sequence of images corresponds to, or is indexed with, the sequence of time points beginning at t=0 and ending at t=T over the time interval/duration of T (unit time). Each of the two GOPs in the second GOP structure of the second primary image stream generated with Camera 2 comprises a sub-sequence of images that begins with an I-frame (denoted as "I"), which is then followed by nine P-frames (respectively denoted as "P1", "P2", . . . "P9").

The secondary image stream in connection with Camera 2 comprises a second sequence of reconstructed I-frames each of which is derived from a corresponding non-I-Frame of all non-I frames in the second primary image stream. As illustrated in FIG. 1B, the secondary image stream in connection with Camera 2 comprises two sub-sequences of reconstructed I-frames. The two sub-sequences of reconstructed I-frames in the secondary image stream in connection with Camera 2 correspond to two GOPs, respectively, in the second primary image stream generated with Camera 2.

Each sub-sequence of reconstructed I-frames in the two sub-sequences of reconstructed I-frames in connection with Camera 2 corresponds to a respective GOP of the GOPs in the second primary image stream generated with Camera 2. Each such sub-sequence of reconstructed I-frames comprises reconstructed I-frames (respectively denoted as "I'1", "I'2", . . . "I'9") generated from non-I-frames ("P1", "P2", . . . "P9") in the respective GOP.

For example, I and P1 in the respective GOP of the second primary image stream generated with Camera 2 may be used to generate a reconstructed I-frame I'1, in a similar manner as described above.

I, P1 and P2 (or I'1 and P2) in the respective GOP of the second primary image stream generated with Camera 2 may be used to generate a reconstructed I-frame I'2, in a similar manner as described above.

I and P1 through Pi (or I'(i−1) and Pi), where i is any non-zero positive integer, in the respective GOP of the second primary image stream generated with Camera 2 may be used to generate a reconstructed I-frame I'i, in a similar manner as described above.

Figure 1C:
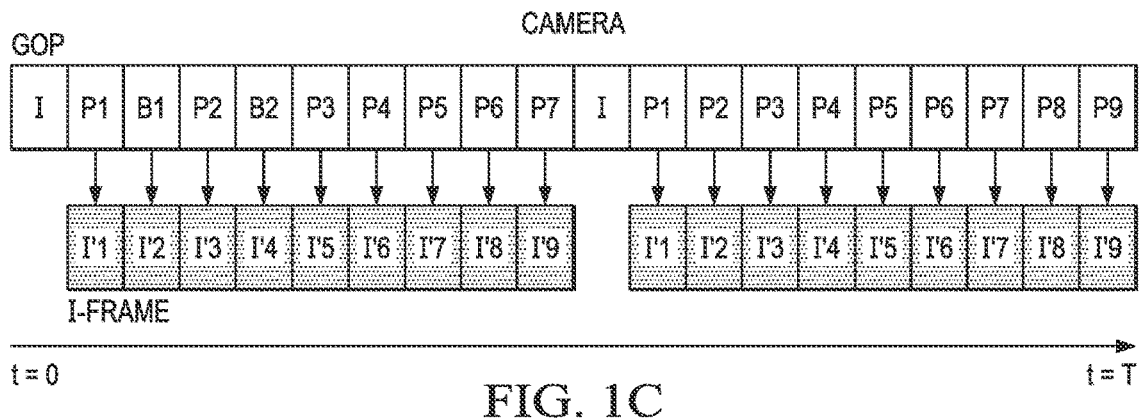

It should be noted that reconstructed I-frames may be generated or constructed with a GOP comprising B-frames. FIG. 1C illustrates example dual bitstream structures for a camera as described herein in a plurality of cameras of a multi-view camera system (e.g., 100 of FIG. 1A, etc.) used to generate a multi-view video stream.

A dual bitstream structure for image data generated with the camera comprises a primary image stream (denoted as "GOP") that implements a GOP structure and a secondary image stream (denoted as "I-Frame") that comprises reconstructed I-frames derived from the primary image stream.

The GOP structure of the primary image stream generated with the camera comprises a sequence of images that are consecutively partitioned into two GOPs. The sequence of images corresponds to, or is indexed with, a sequence of time points beginning at t=0 and ending at t=T over a time interval/duration of T (unit time). The first GOP in the GOP structure of the primary image stream generated with the camera comprises a first sub-sequence of images that begins with an I-frame (denoted as "I"), which is then followed by a mixture of P-frames and B-frames (respectively denoted as "P1", "B1", "P2", "B2", . . . "P7"). The second GOP in the GOP structure of the primary image stream generated with the camera comprises a second sub-sequence of images that begins with an I-frame (denoted as "I"), which is then followed by P-frames and B-frames (respectively denoted as "P1", "P2", . . . "P9").

The secondary image stream in connection with the camera comprises a sequence of reconstructed I-frames each of which is derived from a corresponding non-I-Frame of all non-I frames in the primary image stream. As illustrated in FIG. 1C, the secondary image stream in connection with the camera comprises two sub-sequences of reconstructed I-frames. The two sub-sequences of reconstructed I-frames in the secondary image stream in connection with the camera correspond to two GOPs, respectively, in the primary image stream generated with the camera.

Each sub-sequence of reconstructed I-frames in the two sub-sequences of reconstructed I-frames in connection with the camera corresponds to a respective GOP of the GOPs in the primary image stream generated with the camera. For example, the first sub-sequence of reconstructed I-frames comprises reconstructed I-frames (respectively denoted as "I'1", "I'2", . . . "I'9") generated from non-I-frames ("P1", "B1", "P2", "B2", . . . "P7") in the first GOP.

For example, the I-frame denoted as I in the first GOP of the primary image stream generated with the camera may contain or produce a complete image/picture without any reference to preceding or succeeding images/pictures. The I-frame I or the complete image/picture corresponding to or stored in the I-frame I may be buffered in a reference picture buffer as a part of coding context for decoding subsequent images/pictures after the I-frame is decoded from the primary image stream.

The I-frame I and the P-frame P1 in the first GOP of the primary image stream generated with Camera 1 may be used to generate a reconstructed I-frame I'1. More specifically, the P-frame P1 stores only changes from the complete image/picture corresponding to or stored in the I-frame I. After the changes stored in the P-frame P1 are decoded from the primary image stream generated with Camera 1, these changes can be added to (or subtracted from depending on the signs of the changes) the complete image/picture corresponding to or stored in the I-frame I to generate or construct the reconstructed I-frame I'1 comprising a complete image/picture corresponding to (but only the changes stored in) the P-frame P1. The reconstructed I-frame I'1 or the complete image/picture corresponding to the P-frame P1 may be buffered in the reference picture buffer as a part of updated coding context for decoding subsequent images/pictures after the P-frame P1 is decoded from the primary image stream and after the reconstructed I-frame I'1 or the complete image/picture corresponding to the P-frame P1 is generated or constructed.

Assume that the B-frame B1 depends on or makes reference to both the P-frame P1 and the P-frame P2. More specifically, the B-frame B1 contains only changes from complete images/pictures corresponding to both the P-frame P1 and the P-frame P2. For example, some image blocks of the B-frame B1 may contain only changes from the P-frame P1, while some other image blocks of the B-frame B1 may contain only changes from the P-frame P2. To generate or construct a reconstructed I-frame I'2 corresponding to the B-frame B1, a reconstructed I-frame I' 3 corresponding to the P-frame P2 may be generated before the reconstructed I-frame I'2 corresponding to the B-frame B1 is generated or constructed.

I, P1 and P2 (or I'1 and P2) in the first GOP of the primary image stream generated with the camera may be used to generate the reconstructed I-frame I'3. More specifically, the P-frame P2 stores only changes from a complete image/picture corresponding to either or both of the I-frame I and the P-frame P1. For the purpose of illustration only, the P-frame P2 stores only changes from the reconstructed I-frame I'1 or the complete image/picture corresponding to the P-frame P1. After the changes stored in the P-frame P2 are decoded from the primary image stream generated with the camera, these changes can be added to (or subtracted from depending on the signs of the changes) the reconstructed I-frame I'1 or the complete image/picture corresponding to the P-frame P1 to generate or construct the reconstructed I-frame I'3 comprising a complete image/picture corresponding to (but only the changes stored in) the P-frame P2. The reconstructed I-frame I'3 or the complete image/picture corresponding to the P-frame P2 may be buffered in the reference picture buffer as a part of further updated coding context for decoding subsequent images/pictures after the P-frame P2 is decoded from the primary image stream and after the reconstructed I-frame I'3 or the complete image/picture corresponding to the P-frame P2 is generated or constructed.

I, P1, P2, B1 (or I, I'1, I'3, B1) in the first GOP of the primary image stream generated with the camera may be used to generate the reconstructed I-frame I'2. After the changes stored in the B-frame B1 are decoded from the primary image stream generated with the camera, some of these changes in some image blocks can be added to (or subtracted from depending on the signs of the changes) image data in corresponding image blocks in the reconstructed I-frame I'1 or the complete image/picture corresponding to the P-frame P1, while some others of these changes in some other image blocks can be added to (or subtracted from depending on the signs of the changes) image data in corresponding image blocks in the reconstructed I-frame I'3 or the complete image/picture corresponding to the P-frame P2. As the changes in the B-frame B1 are combined with corresponding image data in the reconstructed I-frames I'1 and I'3 respectively corresponding to the P-frames P1 and P2, the reconstructed I-frame I'2 comprising a complete image/picture corresponding to (but only the changes stored in) the B-frame B1 can be generated or constructed. The reconstructed I-frame I'2 or the complete image/picture corresponding to the B-frame B1 may be buffered in the reference picture buffer as a part of further updated coding context for decoding subsequent images/pictures after the B-frame B1 is decoded from the primary image stream and after the reconstructed I-frame I'2 or the complete image/picture corresponding to the B-frame B1 is generated or constructed. Likewise, other reconstructed I-frames may be constructed for the first GOP in the first GOP of the primary image stream generated with the camera.

3. Viewing Volume and Real Time Video Streaming

In an AR, VR or volumetric video application, display images rendered in a viewer's viewport are updated in response to the viewer's head (or body) motions to provide immersive and comfortable viewing experiences. The viewer may be allowed to freely make head (or body) motions along a one-dimensional line/curve, in a 2-dimensional (2D) viewing area, in a 3D viewing volume, or in a specific venue, to view position-specific or orientation-specific (e.g., 2D, 3D, etc.) images rendered by the video application in the viewer's viewport, and to get correct orientations to visual objects depicted in the position-specific or orientation-specific images. As used herein, a viewport may refer to any of: a designated display area on AR glasses, a wearable VR display, an image display operating in conjunction with the viewer's video streaming client device, etc.

Figure 2A:
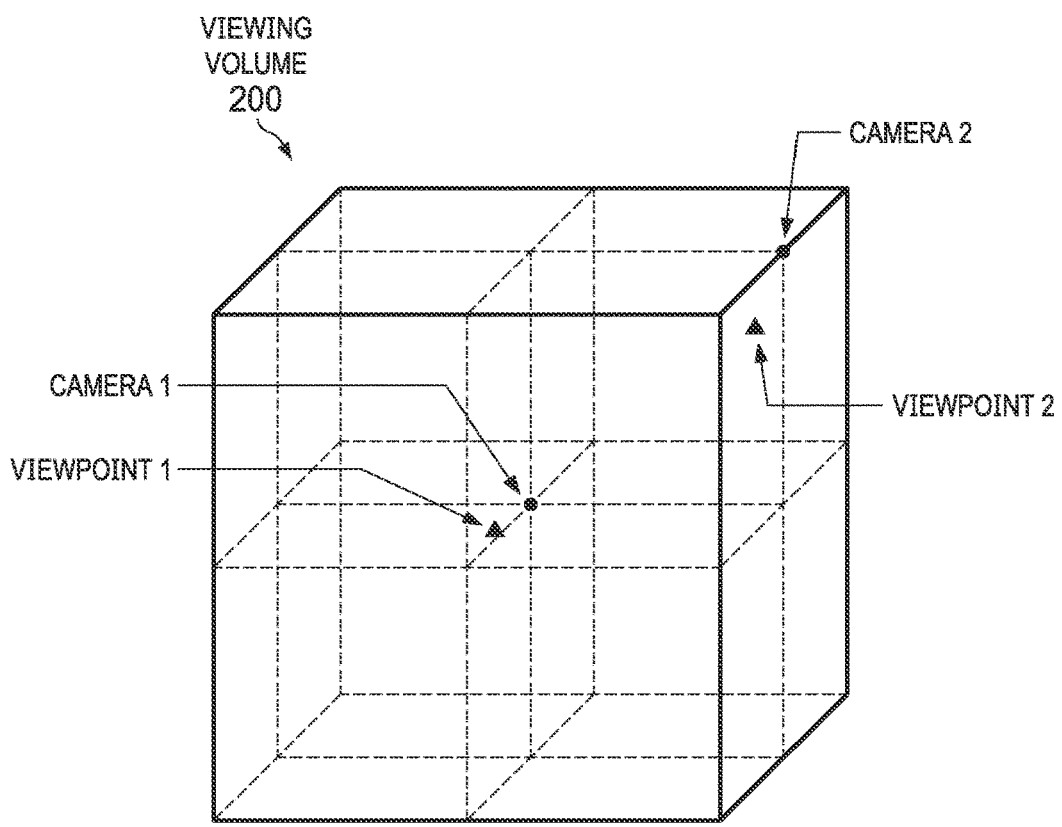
FIG. 2A illustrates an example viewing volume.

FIG. 2A illustrates an example viewing volume 200 in which a viewer of an AR, VR or volumetric video application may freely move around, and view position-specific or orientation-specific images rendered by the video application.

As shown, the viewer's position or orientation at a first time point of a time interval/duration (e.g., between t=0 and t=T of FIG. 1B, etc.) is represented by viewpoint 1 of FIG. 2. The viewer's position or orientation at a second time point (e.g., immediately subsequent to the first time point, etc.) of the time interval/duration is represented by viewpoint 2 of FIG. 2.

One or more first single-view images in a first multi-view image—in a multi-view image stream—that corresponds to the first time point can be used to warp to, interpolate or blend into and/or generate a first position-specific or orientation-specific image for the first time point. One or more second single-view images in a second multi-view image—in the same multi-view image stream—that corresponds to the second time point can be used to warp to, interpolate or blend into and/or generate a second position-specific or orientation-specific image for the second time point. These position-specific or orientation-specific images can be rendered in the viewer's viewport to the viewer at the first and second time points, respectively.

The multi-view image stream comprises a sequence of multi-view images represented in a plurality of dual bitstream structures. Each dual bitstream structure in the plurality of dual bitstream structures comprises a primary image stream implemented with the GOP structure (e.g., I-, P- and/or B-frames in each of multiple GOPs, etc.) for bitrate efficiency and a secondary image stream comprising reconstructed I-frames generated from the primary image stream. Each dual bitstream structure in the plurality of dual bitstream structures of the multi-view image stream is derived directly or indirectly from a respective individual single-view image stream (e.g., source, input, highly detailed, uncompressed and/or raw images, etc.) in a plurality of individual single-view image streams captured with a plurality of cameras of a multi-view camera system.

A first subset of one or more dual bitstream structures—in the plurality of dual bitstream structures—that are derived directly or indirectly from one or more first individual single-view image streams of one or more first cameras (e.g., the nearest camera to the viewer's position or orientation, the center camera of a spatial region, a set of four nearest camera around the viewer's viewpoint, etc.) in the plurality of cameras may be selected to be used to warp to, interpolate or blend into and/or generate the first position-specific or orientation-specific image to be rendered in the viewer's viewport at the first time point. The one or more first cameras may include Camera 1 but does not include Camera 2. Image processing operations such as image warping, image blending, etc., may be used to generate image data of the first position-specific or orientation-specific image from image data of the first subset of one or more dual bitstream structures in connection with the one or more second cameras such as Camera 1.

A second different subset of one or more dual bitstream structures—in the plurality of dual bitstream structures—that are derived directly or indirectly from one or more second individual single-view image streams of one or more second cameras (e.g., the nearest camera to the viewer's position or orientation, the center camera of a spatial region, a set of four nearest camera around the viewer's viewpoint, etc.) in the plurality of cameras may be selected to be used to warp to, interpolate or blend into and/or generate the second position-specific or orientation-specific image to be rendered in the viewer's viewport at the second time point. The one or more second cameras may include Camera 2 but does not include Camera 1. Image processing operations such as image warping, image blending, etc., may be used to generate image data of the second position-specific or orientation-specific image from image data of the second subset of one or more dual bitstream structures in connection with the one or more second cameras such as Camera 2.

Figure 2B:
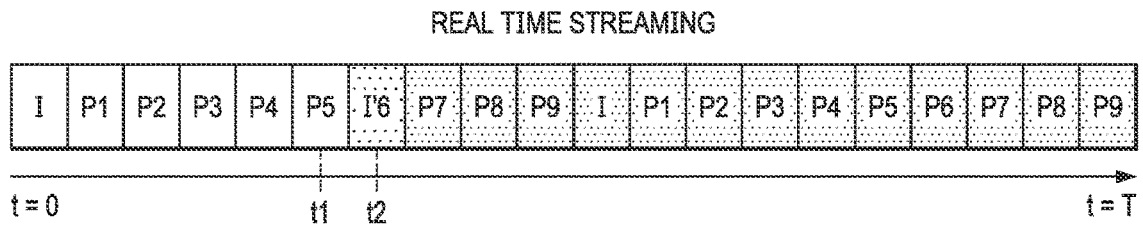
FIG. 2B illustrates example real time image streaming for just-in-time intelligent rendering.

FIG. 2B illustrates example real time (image) streaming for just-in-time intelligent rendering. For the purpose of illustration only, for one or more time points before and up to a first time point (denoted as "t1"), a viewer's position or orientation is represented by viewpoint 1 of FIG. 2A Image data derived directly or indirectly from Camera 1 may be used to generate or construct one or more first images to be rendered in the viewer's viewport at these time points before and up to the first time point ("t1"). More specifically, one or more I and P frames (e.g., I, P1, P2, P3, P4 and/or P5, etc.) in a GOP of a first primary image stream of a first dual bitstream structure of a first single-view image stream—in a multi-view image stream comprising a plurality of single-view image streams in connection with a plurality of cameras of a multi-view camera system—in connection with Camera 1 are used to generate the one or more first images to be rendered in the viewer's viewport at these time points before and up to the first time point ("t1").

Starting from a second different time point (denoted as "t2"), which may immediately follow the first time point ("t1"), the viewer's position or orientation is changed by the viewer's head or body motion and now represented by viewpoint 2 of FIG. 2A. Image data derived directly or indirectly from Camera 2 may be used to generate or construct one or more second images to be rendered in the viewer's viewport at time points starting from the second time point ("t2") until the viewer's position or orientation is further changed by the viewer's further head or body motion.

In the present example, the change of the viewer's position or orientation from viewpoint 1 to viewpoint 2 occurs in the middle of a GOP of a second primary image stream of a second dual bitstream structure of a second single-view image stream—in the multi-view image stream—in connection with Camera 2.

If non-I frames from the GOP of the second primary image stream of the second dual bitstream structure of the second single-view image stream in connection with Camera 2 were to be streamed to the viewer's video streaming client device, then image data in the non-I frames in connection with Camera 2 would be incorrectly interpreted based on previous received or constructed images/frames (e.g., I, P1, P2, P3, P4 and P5 frames, etc.) in connection with Camera 1. As a result, visual artifacts would be generated in the one or more second images to be rendered in the viewer's viewport starting from the second time point ("t2").

Alternatively, while the change of the viewer's position or orientation from viewpoint 1 to viewpoint 2 occurs in the middle of the GOP of the second primary image stream of the second dual bitstream structure of the second single-view image stream in connection with Camera 2, images constructed from image data derived directly or indirectly from Camera 1 could continue to be streamed until the GOP of the second primary image stream of the second dual bitstream structure of the second single-view image stream in connection with Camera 2 ends. However, if the GOP of the second primary image stream of the second dual bitstream structure of the second single-view image stream in connection with Camera 2 covers a relatively long period longer than a viewer perceptible time lag threshold, then a viewer perceptible time lag would be noticed by the viewer, causing a viewer-noticeable discrepancy between what the viewer expects to see and what the viewer actually sees. This would greatly and negatively impact the viewer's experience in an AR, VR or volumetric video application, especially if such a time lag occurs in viewing rendered images depicting dynamically changing scenes or emotionally engaging scenes.

Instead of delaying to the next GOP boundary (e.g., where a GOP ends and a next GOP starts, etc.) and/or sending images/frames that could be misinterpreted, under techniques as described herein, in response to determining that a change of the viewer's position or orientation occurs in the middle of a GOP of a primary image stream of a dual bitstream structure of a single-view image stream in connection with a camera that is selected based on (e.g., the nearest to, one of the nearest to, etc.) the viewer's current changed position or current changed orientation, one or more reconstructed I-frames from a secondary image stream of the dual bitstream structure of the single-view image stream in connection with the selected camera are sent to the viewer's video streaming client device.

The one or more reconstructed I-frames from the secondary image stream of the dual bitstream structure of the single-view image stream in connection with the selected camera allow or enable the viewer's video streaming client device to generate one or more position-specific or orientation-specific images to be rendered in the viewer's viewport, with no or little visual artifacts. In addition, the one or more reconstructed I-frames from the secondary image stream of the dual bitstream structure of the single-view image stream in connection with the selected camera allow or enable the viewer's video streaming client device to be placed in correct coding contexts to interpret one or more non-I frames of the primary image stream of the same dual bitstream structure sent or streamed (e.g., immediately, etc.) after the one or more reconstructed I-frames, and generate one or more images from the one or more non-I frames for rendering in the viewer's viewport at one or more subsequent time points.

For example, as illustrated in FIG. 2B, in response to determining that the viewer's position or orientation changes from viewpoint 1 of FIG. 2A at the first time point ("t1") to viewpoint 2 of FIG. 2A at the second time point ("t2"), a reconstructed I-frame (denoted as "I'6") for the second time point ("t2") in a secondary image stream of a dual bitstream structure of a single-view image stream—in the multi-view image stream—in connection with Camera 2 is streamed by an upstream device to the viewer's video streaming client device.

In the present example, the reconstructed I-frame ("I'6") for the second time point ("t2") in the secondary image stream of the dual bitstream structure of the single-view image stream in connection with Camera 2 allows or enables the viewer's video streaming client device to generate a position-specific or orientation-specific image to be rendered in the viewer's viewport for the second time point ("t2"), with no or little visual artifacts. In addition, the reconstructed I-frame ("I'6") for the second time point ("t2") in the secondary image stream of the dual bitstream structure of the single-view image stream in connection with Camera 2 allows or enables the viewer's video streaming client device to be placed in correct coding contexts to interpret one or more non-I frames (e.g., "P7", "P8" and "P9", etc.) of the primary image stream of the same dual bitstream structure sent or streamed (e.g., immediately, etc.) after the reconstructed I-frame ("I'6") for the second time point ("t2"), and generate one or more corresponding images from the one or more non-I frames (e.g., "P7", "P8" and "P9", etc.) for rendering in the viewer's viewpoint at one or more time points subsequent to the second time point ("t2").

As the reconstructed I-frame I'6 in the secondary image stream in connection with the switched-to camera ("Camera 2") was created using I1, P1 through P6 in the GOP of the primary image stream in connection with the switched-to camera ("Camera 2"), the states (e.g., SNR, PSNR, noise, quantization/coding errors, arithmetic encoding states, etc.) of these frames in the GOP of the primary image stream are accumulated and propagated into the reconstructed I-frame I'6. The reconstructed I-frame I'6 can be used by the recipient device to set up a correct context to interpret or process image data of a subsequent non-I-frame such as P7 in the same GOP, as if the subsequent non-I-frame is being interpreted from the starting I-frame and all the preceding non-frames in the same GOP of the primary image stream. As a result, an image (e.g., a display image, etc.) corresponding to the non-I-frame P7 can be constructed or generated from the reconstructed I-frame I'6 and P7. The picture quality of the image constructed or generated from the reconstructed I-frame I'6 and P7 will be the same as the picture quality of an image that would be constructed or generated from the starting I-frame and all the preceding non-frames in the same GOP of the primary image stream. Thus, the image constructed or generated from the reconstructed I-frame I'6 and P7 represents a faithful reconstruction with respect to the image that would be constructed or generated from the starting I-frame and all the preceding non-frames in the same GOP of the primary image stream.

4. Example Video Streaming Devices

Figure 3A:
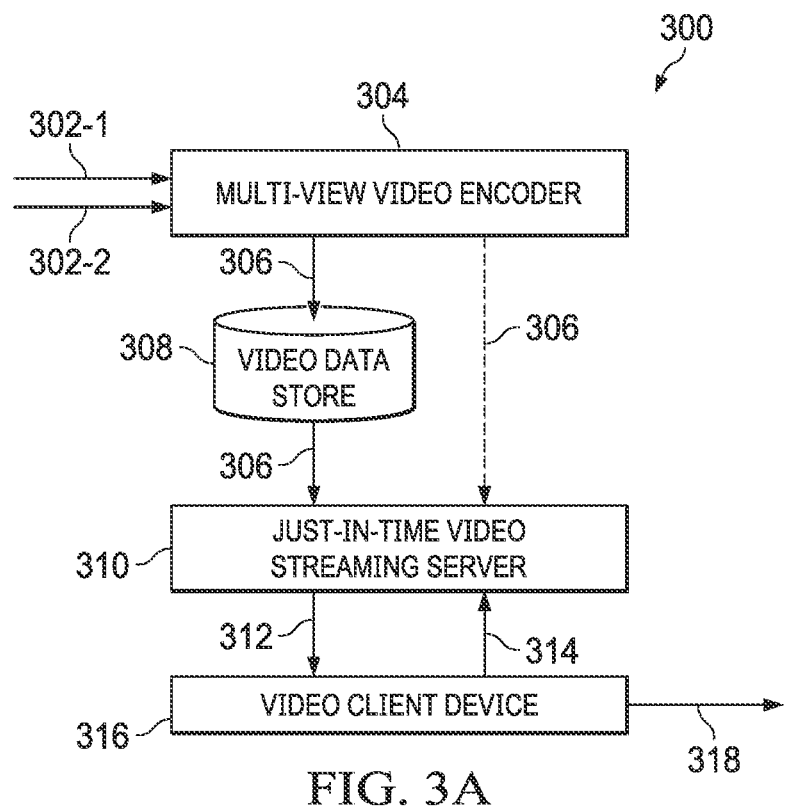
FIG. 3A through FIG. 3D illustrate example video delivery pipeline and example codecs for just-in-time intelligent streaming and rendering.

FIG. 3A illustrates an example video delivery pipeline 300, in which a plurality of source image streams from a plurality of cameras in a multi-view camera system (e.g., 100 of FIG. 1A, etc.) is received by the pipeline (300) as input from an external video data source, and a target video stream is outputted by the pipeline (300) as output for rendering to a viewer. Each source image stream in the plurality of source image streams is generated or derived from image data captured by a respective camera in the plurality of cameras.

By way of example but not limitation, the plurality of source image streams comprises a first source image stream 302-1 generated with Camera 1 in the plurality of cameras and a second source image stream 302-2 generated with Camera 2 in the plurality of cameras. Each source image stream (e.g., 302-1, 302-2, etc.) in the plurality of source image streams, as received by the pipeline 300, comprises a sequence of (e.g., uncompressed, raw, relatively high quality, etc.) source (video) images.

The video delivery pipeline (300) includes a multi-view video encoder 304 that generates a plurality of primary image streams from the plurality of source image streams (e.g., 302-1, 302-2, etc.). Each primary image stream in the plurality of primary image streams is derived from a respective source image stream—as generated with a respective camera in the plurality of cameras—in the plurality of source image streams.

As compared with the plurality of source image streams, the plurality of primary image streams is much compressed for bitrate efficiency. Each primary image stream in the plurality of primary image streams comprises a sequence of GOP images implemented with a GOP structure. The sequence of GOP images in the primary image stream comprises a plurality of GOPs each of which comprises I-, B- and P-frames. Implementing the GOP structure in the sequence of GOP images in the primary image stream reduces or eliminates data redundancy in the sequence of images. In some operational scenarios, only I- and P-frames are used for video compression as described herein. In these operational scenarios, the decode order and the display order can be the same; subsequent P-frames only depending on previous frame (e.g., I'-frames or I-frames in the secondary image stream, etc.) for temporal prediction. In some operational scenarios, B-frames are also used at least in part for video compression as described herein. In these operational scenarios, the decode order and the display order can be different; previous or subsequent frames (e.g., I'-frames or I-frames in the secondary image stream, etc.) on which a B-frame depends—or all of the decoding order frames (which need not be display order frames—can be sent to a recipient decoding device. This will ensure bi-directional or dual prediction capability of B-frames. In these operational scenarios, when a random access is performed, the first frame in random access can be display frame or a decode only frame used or referenced by B-frames, and the order of I' frames sent to the recipient decoding device need not be as shown in figures herein which are in the display order.

The multi-view video encoder (304) further generates a plurality of secondary image streams from the plurality of primary image streams. Each secondary image stream in the plurality of secondary image streams is generated by the multi-view video encoder (304) from a respective primary image stream in the plurality of primary image streams, and comprises a sequence of reconstructed I-frames generated from non-I-frames in a sequence of GOP images of the respective primary image stream. For example, each non-I-frame in the sequence of GOP images of the respective primary image stream may be used to generate a respective reconstructed I-frame in the sequence of reconstructed I-frames in the secondary image stream.

The multi-view video encoder (304) generates a multi-view image stream 306 based on the plurality of primary image streams and the plurality of secondary image streams. For example, the multi-view image stream (306) comprises a plurality of dual bitstream structures. Each dual bitstream structure in the plurality of bitstream structures includes a respective primary image stream in the plurality of primary image streams and a respective secondary image stream in the plurality of secondary image streams.

The multi-view image stream (306) is delivered to a recipient (e.g., just-in-time, supporting intelligent-rendering, etc.) streaming server directly or indirectly over one or more first data links (or first computer network paths) with relatively high bandwidth, relatively low latency, etc.

In a first example, the multi-view image stream (306) may be first outputted by the multi-view video encoder (304) and stored on a tangible computer-readable storage medium such as a multi-view video data store 308, and then retrieved by a (e.g., just-in-time, supporting intelligent-rendering, recoding, etc.) streaming server from the tangible computer-readable storage medium.

In a second example, the multi-view image stream (306) may be outputted by the multi-view video encoder (304) to the streaming server directly.

A downstream video client device 316 (e.g., a wearable device, a VR client device, an AR client device, a video decoder, etc.) operating with an image display to render images to a viewer can determine the viewer's positions or orientations in real time or in near real time by using position sensors, motion sensors, eye tracking devices, etc., to collect real time or near real time viewpoint data 314 in connection with the viewer's positions or orientations. The viewer's position or orientation at a given time point may be monitored and determined (e.g., by the video client device (316), the just-in-time video streaming server (310), etc.) in real time or near real time (e.g., with a latency of 1 or 5 milliseconds or 20 milliseconds, with a strict latency below a perceptible time lag threshold or budget, etc.).

The viewpoint data (314) and/or the viewer's positions or orientations determined from the viewpoint data may be signaled/provided to by the downstream device (316) to an upstream device (e.g., a VR server, an AR server, a multi-view video encoder, etc.) such as the just-in-time video streaming server (310).

Based on a specific position or orientation of the viewer at a specific time point, the video streaming server (310) can identify, from among the plurality of dual bitstream structures of the multi-view image stream (306), a subset of one or more dual bitstream structures in connection with a subset of one or more cameras that are determined to be near (e.g., one or more nearest, etc.) to the viewer's specific position or orientation Image data from one or more primary image streams and/or one or more secondary image streams, of the subset of one or more dual bitstream structures, is streamed in a real time video stream 312 (e.g., as illustrated in FIG. 2B, etc.) by the just-in-time video streaming server (310) to the downstream video client device (316) over one or more second data links (or second computer network paths). The second data links may be with relatively low bandwidth, relatively high latency, etc., as compared with the first data links (or the first computer network paths).

The video client device (316) decodes the image data from the real time video stream (312) and performs image warping/blending with respect to the image data as decoded from the real time video stream (312) to generate a position-specific or orientation-specific image corresponding to the viewer's specific position or specific orientation. The position-specific or orientation-specific image may be provided by the video client device (316) in the output stream (318) to the image display operating in conjunction with the video client device (316) for rendering to the viewer for the specific time point.

Figure 3B:
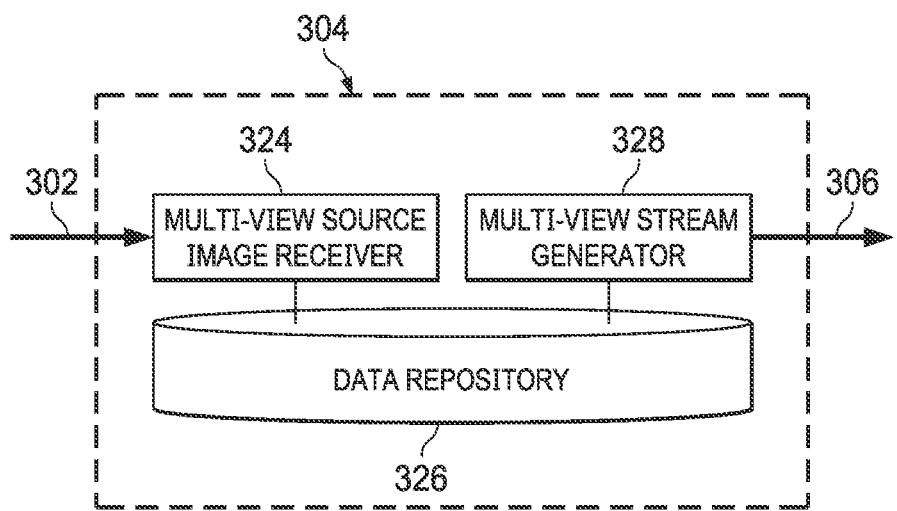

FIG. 3B illustrates an example multi-view video encoder (e.g., 304, etc.) that comprises a multi-view source image receiver 324, a multi-view stream generator 328, a data repository 326, etc. Some or all of the components of the multi-view video encoder (304) may be implemented by one or more devices, modules, units, etc., in software, hardware, a combination of software and hardware, etc.

The multi-view source image receiver (324) comprises software, hardware, a combination of software and hardware, etc., configured to receive a plurality of single-view source (e.g., raw, uncompressed, high quality, etc.) image streams 304 from a multi-view image source such as a cloud-based multi-view image source, a multi-view camera system (e.g., 100 of FIG. 1A, etc.) in connection with a VR application, an AR application, a remote presence application, a display application, a volumetric video application, an immersive video application, etc.; decode a plurality of sequences of single-view source images from the plurality of single-view source image streams (304); etc.

In some embodiments, the multi-view stream generator (328) comprises software, hardware, a combination of software and hardware, etc., configured to generate a multi-view image stream 306 with dual bitstream structures from the plurality of sequences of single-view source images received in the plurality of single-view image streams (302).

The data repository (326) represents one or more databases, one or more data storage units/modules/devices, etc., configured to support operations such as storing, updating, retrieving, deleting, etc., with respect to some or all of the plurality of sequences of single-view source images as received by the multi-view source image receiver (324), the multi-view image stream (306), etc.

Figure 3C:
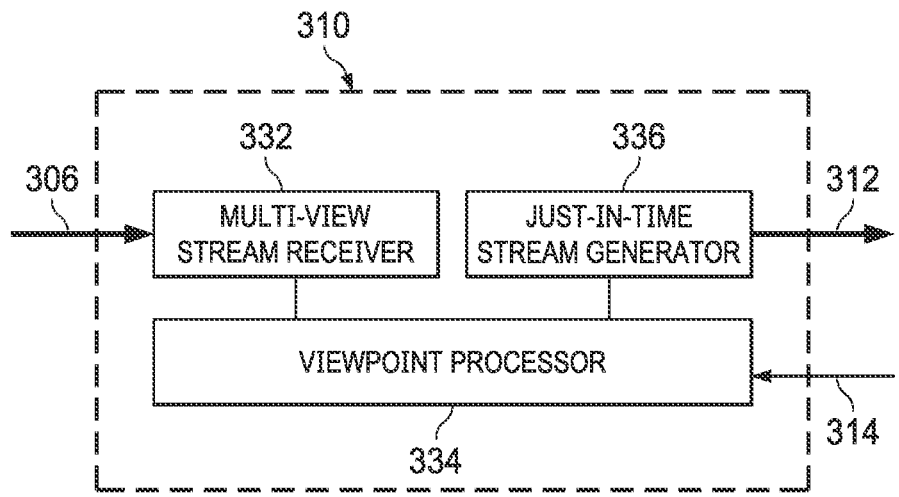

FIG. 3C illustrates an example (just-in-time) video streaming server 310 that comprises a multi-view stream receiver 332, a viewpoint processor 334, a just-in-time stream generator 336, etc. Some or all of the components of the video streaming server (310) may be implemented by one or more devices, modules, units, etc., in software, hardware, a combination of software and hardware, etc.

The multi-view stream receiver (332) comprises software, hardware, a combination of software and hardware, etc., configured to receive the multi-view image stream (306) directly or indirectly from the multi-view video encoder (304); decode primary and secondary image streams in the multi-view image stream (306); etc.

The viewpoint processor (334) comprises software, hardware, a combination of software and hardware, etc., configured to receive a viewer's viewpoint data from a video client device operated by the viewer in real time or near real time; establish/determine the viewer's positions or orientations for a plurality of time points over a time interval/duration of an AR, VR or volumetric video application in which images derived from the multi-view image stream (306) are to be rendered at the plurality of time points in the viewer's viewport as provided with an image display operating in conjunction with the video client device; etc.

The just-in-time stream generator (336) comprises software, hardware, a combination of software and hardware, etc., configured to generate a real time stream 312 from image data of subsets of dual bitstream structures in the multi-view image stream (306) based at least in part on the viewer's positions or orientations; etc.

The video streaming server (310) may be used to support AR applications, VR applications, 360 degree video applications, volumetric video applications, real time video applications, near-real-time video applications, non-real-time omnidirectional video applications, automobile entertainment, helmet mounted display applications, heads up display applications, games, 2D display applications, 3D display applications, multi-view display applications, etc.

Figure 3D:
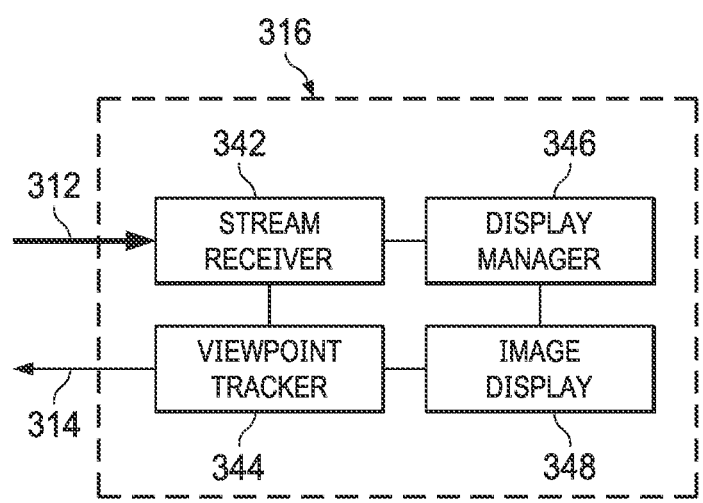

FIG. 3D illustrates an example video client device 316 that comprises a real time stream receiver 342, a viewpoint tracker 344, a display manager 346, image display 348, etc. Some or all of the components of the video client device (316) may be implemented by one or more devices, modules, units, etc., in software, hardware, a combination of software and hardware, etc.

The viewpoint tracker (344) comprises software, hardware, a combination of software and hardware, etc., configured to operate with one or more viewer position/orientation tracking sensors (e.g., motion sensors, position sensors, eye trackers, etc.) to collect real time or near real time viewpoint data 314 in connection with the viewer; send the viewpoint data (314) or the viewer's positions/orientations determined from the viewpoint data to the just-in-time video streaming server (310); etc. The viewpoint data (314) may be sampled or measured at a relatively fine time scale (e.g., every millisecond, every five milliseconds, etc.). The viewpoint data can be used to establish/determine the viewer's positions or orientations at a given time resolution (e.g., every millisecond, every five milliseconds, etc.).

The real time stream receiver (342) comprises software, hardware, a combination of software and hardware, etc., configured to receive and decode the real time video stream (312) generated at least in part based on the viewpoint data (314); perform image warping, image blending (e.g., blending multiple warped images from multiple camera sources, etc.), image composition, etc., on image data decoded from the real time video stream (312) to generate position-specific or orientation-specific images corresponding to the viewer's predicted or measured positions or orientations; etc.

The display manager (346) comprises software, hardware, a combination of software and hardware, etc., configured to perform display management operations on the position-specific or orientation-specific images to be rendered on the image display (348); output display managed position-specific or orientation-specific images to the image display (348) for rendering; etc.

In some operational scenarios, image metadata is transmitted with a real time video stream from a streaming server to a streaming client to indicate spatial positions or orientations of selected cameras that capture image data used to generate or derive I-frames and non-I-frames of primary image streams, reconstructed I-frames, etc., represented or encoded in the real time video stream. The spatial positions or orientations of the cameras may or may not be represented or converted into a reference (e.g., Cartesian, angular, the World, etc.) coordinate system in which viewer positions or orientations are represented. Coordinate system transformation operations may be performed by the streaming server and/or the streaming client.

Some or all of the image metadata transmitted in the real time video stream may be in any of: SEI (supplemental enhancement information), PPS (picture parameter set), SPS (sequence parameter set), slice header, a separate sub-stream or streamed file, etc.

In some operational scenarios, primary image streams derived from different cameras of a multi-view camera system may be coded with a time synchronized GOP structure. In these operational scenarios, an I frame in a GOP (of a primary image stream) depicting a scene is timewise indexed or corresponds to another I frame in another GOP (of another primary image stream) depicting the same scene. Similarly, a P- or B-frame in the GOP (of the primary image stream) depicting the scene is timewise indexed or corresponds to another P- or B-frame in the other GOP (of the other primary image stream) depicting the same scene. Image metadata indicating timing information of one time synchronized primary or secondary image stream in connection with one camera may be received with images in SEI, PSP, SPS, etc., and used by a recipient device of the image metadata to dynamically switch to another time synchronized primary or secondary image stream in connection with another camera.

In some operational scenarios, primary image streams derived from different cameras of a multi-view camera system may be coded with different GOP structures that may not be so time synchronized Image metadata may be generated to indicate different timing information in different image streams and sent in SEI, PPS, SPS, etc., from an upstream device such as a multi-view video encoder or a just-in-time video streaming server to a downstream recipient device such as the just-in-time video streaming server or a video streaming client. The timing information may be used by the recipient device to dynamically switch between or among image streams and fetch images from correct primary image streams and/or secondary image streams as appropriate.

As used herein, image streams in connection with a proper subset of cameras may be selected from a plurality of cameras of a multi-view camera system may be selected by a just-in-time video streaming server to provide, to a recipient video streaming client, image data to construct position-specific or orientation-specific images to be rendered in a viewer's viewport. In an example, the proper subset of cameras may be a single camera at a specific position such as one corresponding to the center or a point of symmetry in a viewing volume in which the viewer is allowed to move or change to different positions or different orientations with respect to depicted scenes as rendered in the viewer's viewport. In another example, the proper subset of cameras may be multiple cameras such as four cameras near or nearest to the viewer's position or orientation in the viewing volume.

A recipient device can use image metadata or timing information therein to determine a corresponding image frame in a primary or secondary image stream of a camera to which a switch is made is at a GOP boundary or not. In response to determining that the switch occurs at the GOP boundary, a corresponding GOP in the primary image stream of the switched-to camera starting from the first I-frame in the GOP may be fetched from a multi-view image stream stored in a data store or transmitted from an upstream video encoder and provided from a just-in-time streaming server to a streaming client. On the other hand, in response to determining that the switch does not occur at the GOP boundary, a reconstructed I-frame in the secondary image stream of the switched-to camera may be fetched from the multi-view image stream and provided from the just-in-time streaming server to the streaming client, followed by non-I-frames in the primary image stream of the switched-to camera.

A viewer's position or orientation may be determined from real time or near real time geo, eye tracking or sensory data (viewpoint data) from a client device as described herein.

In some operational scenarios, a B- or P-frame as described herein may make reference to temporally (e.g., immediate, next, etc.) adjacent frames. In these operational scenarios, a single reconstructed I-frame from a secondary image stream may be sent to a recipient video decoder to (e.g., sufficiently, etc.) place the recipient video decoder in a correct starting coding context for decoding subsequent non-I-frames from a corresponding primary image stream.

In some other operational scenarios, a B- or P-frame as described herein may make reference to other frames (e.g., up to 15 frames, etc.) in addition to or in place of the temporally (e.g., immediate, next, etc.) adjacent frames. In these operational scenarios, multiple (e.g., consecutive, etc.) reconstructed I-frames from a secondary image stream may be sent to sufficiently place a recipient video decoder to (e.g., sufficiently, etc.) place the recipient video decoder in a correct starting coding context for decoding subsequent non-I-frames from a corresponding primary image stream.

For the purpose of illustration only, it has been described that a dual bitstream structure, in connection with a camera or an image acquisition device, comprising a primary image stream and a secondary image stream can be generated by a multi-view video encoder. It should be noted that, in other embodiments, a dual bitstream structure as described herein may be created or generated by other devices. A primary image stream and a secondary image stream in a dual bitstream structure as described herein may or may not be generated at the same time, and may or may not be generated by the same device. For example, a just-in-time streaming server may create a secondary image stream on-the-fly from a primary image stream as video content is being streamed to a video streaming client.

For the purpose of illustration only, it has been described that one or more reconstructed I-frames may be sent at the occurrence of a change of a viewer's viewpoint. It should be noted that, in some operational scenarios, additional information and/or additional frames may be sent in conjunction with the reconstructed I-frames. For example, one or more dummy I-frames that comprise additional information to help a recipient coding device set a correct coding context for interpreting non-I frames may be sent by an upstream device to the recipient coding device.

As used herein, video content in a video stream as described herein may include, but are not necessarily limited to, any of: audiovisual programs, movies, video programs, TV broadcasts, computer games, augmented reality (AR) content, virtual reality (VR) content, automobile entertainment content, etc. Example video decoders may include, but are not necessarily limited to, any of: display devices, a computing device with a near-eye display, a head-mounted display (HMD), a mobile device, a wearable display device, a set-top box with a display such as television, a video monitor, etc.

As used herein, a "video streaming server" may refer to one or more upstream devices that prepare and stream video content to one or more video streaming clients such as video decoders in order to render at least a portion of the video content on one or more displays. The displays on which the video content is rendered may be part of the one or more video streaming clients, or may be operating in conjunction with the one or more video streaming clients.

Example video streaming servers may include, but are not necessarily limited to, any of: cloud-based video streaming servers located remotely from video streaming client(s), local video streaming servers connected with video streaming client(s) over local wired or wireless networks, VR devices, AR devices, automobile entertainment devices, digital media devices, digital media receivers, set-top boxes, gaming machines (e.g., an Xbox), general purpose personal computers, tablets, dedicated digital media receivers such as the Apple TV or the Roku box, etc.

5. Example Process Flows

Figure 4A:
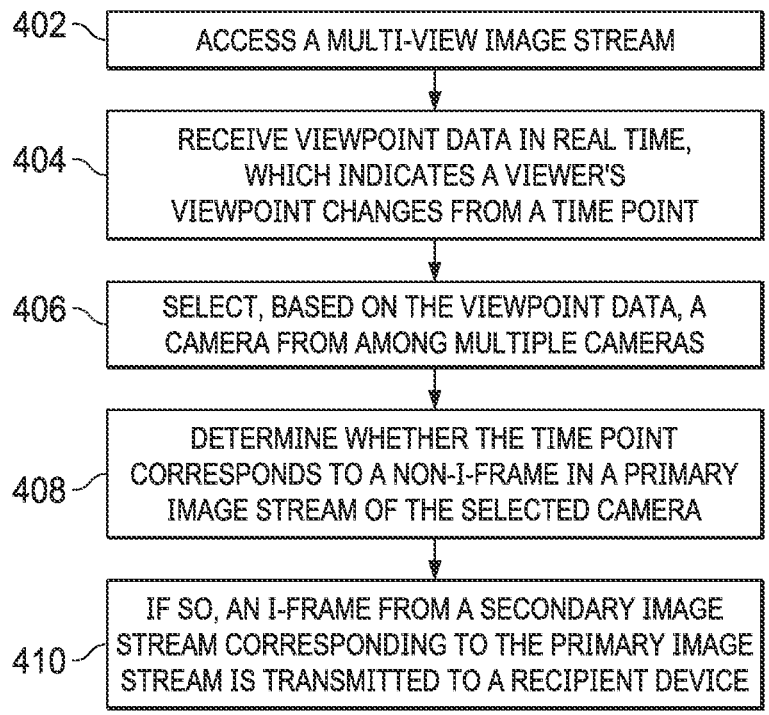
FIG. 4A and FIG. 4B illustrate example process flows.

FIG. 4A illustrates an example process flow according to an example embodiment of the present invention. In some example embodiments, one or more computing devices or components may perform this process flow. In block 402, an image processor (e.g., a video streaming server, a video encoder, a video content provider, a video transcoder, etc.) accesses a multi-view image stream encoded with a plurality of primary image streams and a plurality of secondary image streams. Each primary image stream in the plurality of primary image streams comprises groups of pictures (GOPs). Each secondary image stream in the plurality of secondary image streams comprises I-frames generated from a corresponding primary image stream in the plurality of primary image streams.

In block 404, the image processor receives, from a recipient decoding device, viewpoint data of a viewer collected in real time while the viewer is viewing video content derived from a subset of image data in the multi-view image stream. The viewpoint data indicates the viewer's viewpoint has changed starting from a specific time point.

In block 406, the image processor selects, based on the viewer's changed viewpoint, a camera from among the plurality of cameras. A video content portion derived from an image data portion captured by the selected camera is to be rendered in the viewer's viewport after the specific time point.

In block 408, the image processor determines whether the specific time point corresponds to a non-I-frame in a GOP of a primary image stream in connection with the selected camera.

In block 410, the image processor, in response to determining that the specific time point corresponds to a non-I-frame in a GOP of a primary image stream in connection with the selected camera, transmits, to the recipient decoding device, an I-frame from a secondary image stream corresponding to the primary image stream in connection with the selected camera.

In an embodiment, the plurality of primary image streams comprises a plurality of sequences of single-view images generated from image data captured with a plurality of cameras; each sequence of single-view images in the plurality of sequences of single-view images comprises a plurality of groups of pictures (GOPs); a GOP in the plurality of GOPs comprises I- and non-I-frames.

In an embodiment, the plurality of secondary image streams comprises one of: a plurality of sequences of reconstructed I-frames generated from the plurality of primary image streams or a plurality of sequences of I-frames generated from source images used to derive the plurality of primary image streams.

In an embodiment, the image processor is further configured to: in response to determining that the specific time point corresponds to an I-frame in the GOP of the primary image stream in connection with the selected camera, transmit, to the recipient decoding device, the I-frame.

In an embodiment, the image processor is further configured to: transmit, to the recipient decoding device, one or more subsequent non-I-frames in the GOP of the primary image stream.

In an embodiment, the image processor is further configured to: transmit, to the recipient decoding device, a second I-frame from the secondary image stream immediately after transmitting, to the recipient decoding device, the I-frame from the secondary image stream.

In an embodiment, the selected camera belongs to a subset of cameras selected, based at least in part on the viewer's viewpoint, from among the plurality of cameras; the I-frame belongs to a subset of I-frames in connection with the subset of cameras; the subset of I-frames is transmitted to the recipient decoding device.

In an embodiment, the viewer's viewpoint represents one of: the viewer's position, the viewer's orientation, a combination of the viewer's position and orientation, etc.

In an embodiment, the multi-view image stream is used to support one of: an augmented reality application, a virtual reality application, a cinema video application, a home-based video application, a video streaming application, a cloud-based video application, a Wi-Fi-based video application, a cellular-data-network-based video application, an immersive video application, etc.

Figure 4B:
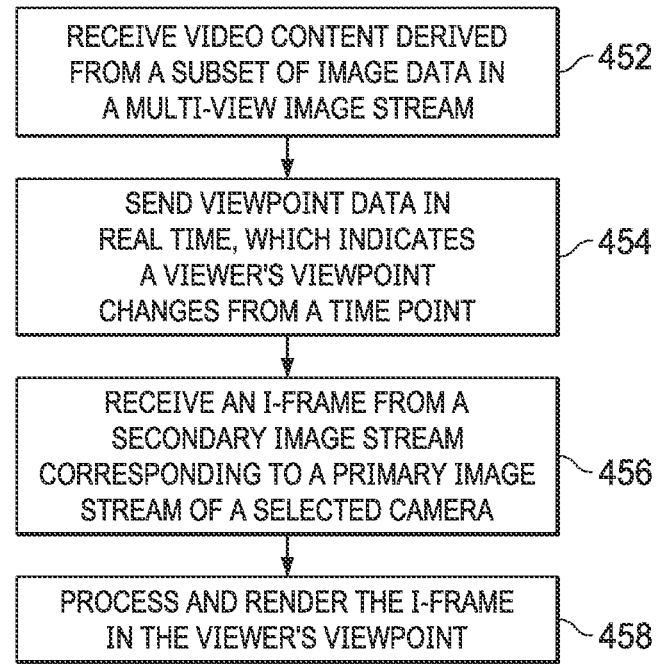

FIG. 4B illustrates an example process flow according to an example embodiment of the present invention. In some example embodiments, one or more computing devices or components may perform this process flow. In block 452, an image processor (e.g., a video streaming client, a video decoder, a set-top device, etc.) receives, from an upstream device, video content derived from a subset of image data in a multi-view image stream encoded with a plurality of primary image streams and a plurality of secondary image streams. Each primary image stream in the plurality of primary image streams comprises groups of pictures (GOPs). Each secondary image stream in the plurality of secondary image streams comprises I-frames generated from a corresponding primary image stream in the plurality of primary image streams.

In block 454, the image processor sends, to the upstream device, viewpoint data of a viewer collected in real time while the viewer is viewing the video content. The viewpoint data indicates the viewer's viewpoint has changed starting from a specific time point.

A camera is selected, based on the viewer's changed viewpoint, from among the plurality of cameras. A video content portion derived from an image data portion captured by the selected camera is to be rendered in the viewer's viewport after the specific time point.

The specific time point corresponds to a non-I-frame in a GOP of a primary image stream in connection with the selected camera.

In block 456, the image processor receives, from the upstream device, an I-frame from a secondary image stream corresponding to the primary image stream in connection with the selected camera.

In block 458, the image processor processes and renders the I-frame in the viewer's viewpoint for the specific time point.

In an embodiment, a non-I-frame from the GOP of the primary image stream is subsequently received; wherein a second display image is derived from the non-I-frame based at least in part on a coding context set up with the I-frame.

In an embodiment, the first image block belongs to a group of two or more contiguous image blocks forming an image region that covers the viewer's direction; the one or more second image block are outside the image region; other images in the group of two or more contiguous image blocks are received, decoded and rendered before the one or more second image blocks.

In an embodiment, the viewer's viewpoint changes within a viewing volume.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
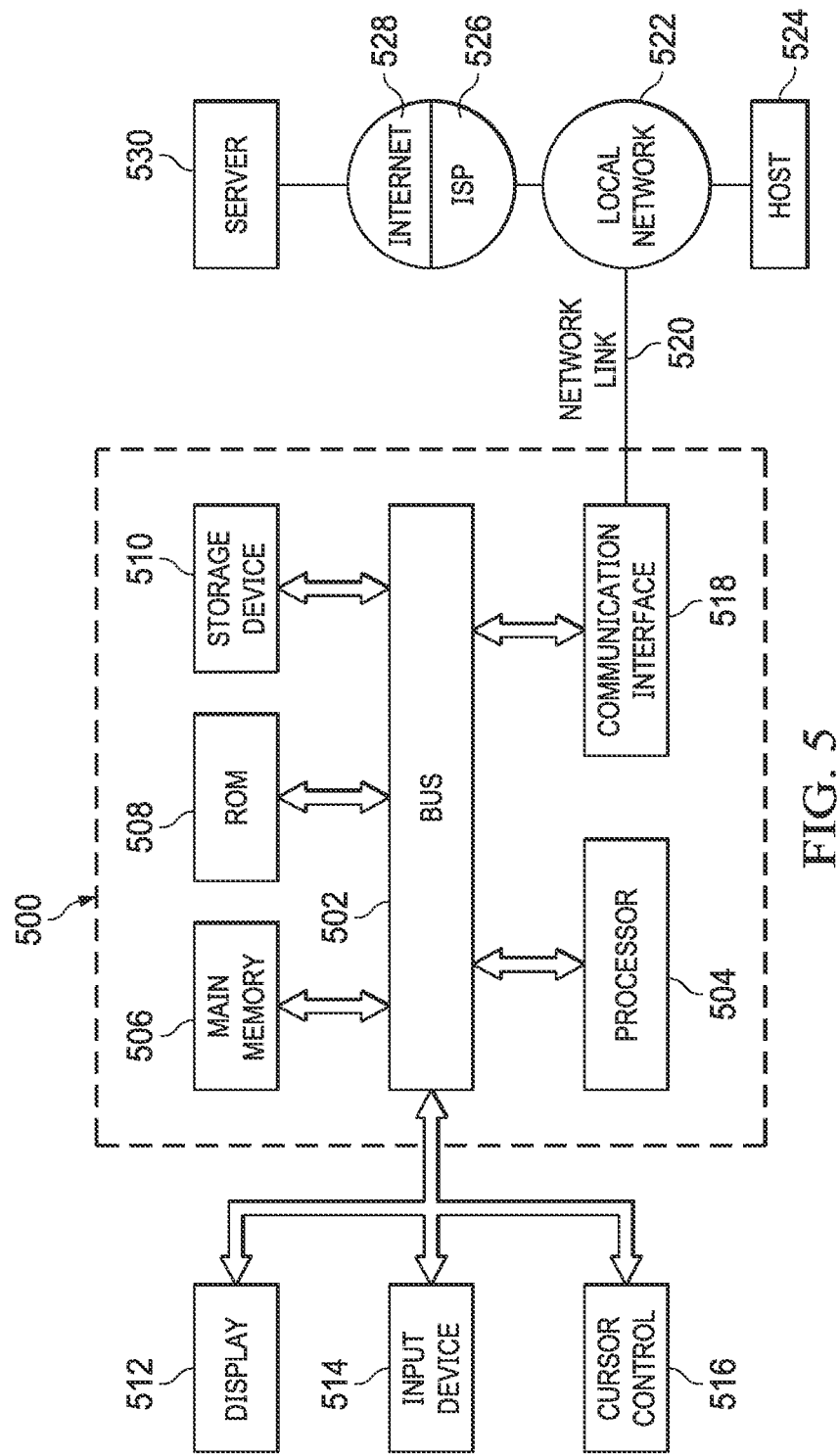
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for providing video stream data, comprising:
accessing a multi-view image stream encoded with a plurality of primary image streams and a plurality of secondary image streams, wherein each primary image stream in the plurality of primary image streams is generated with respective image data captured by a different camera in a plurality of cameras and used to generate a respective secondary image stream in the plurality of secondary image streams, wherein the primary image stream comprises a sequence of single-view images having groups of pictures (GOPs) each of which comprises I-frames and non-I-frames, wherein the respective secondary image stream comprises a sequence of reconstructed I-frames each of which is derived at least in part from a corresponding non-I-frame in a GOP of the primary image stream;

receiving, from a recipient decoding device, viewpoint data of a viewer collected in real time while the viewer is viewing video content derived from a subset of image data in the multi-view image stream, wherein the viewpoint data indicates the viewer's viewpoint has changed starting from a specific time point;

selecting, based on the viewer's changed viewpoint, a specific camera from among the plurality of cameras, wherein a video content portion derived from an image data portion captured by the specific camera is to be rendered in the viewer's viewport after the specific time point;

in response to determining that the specific time point corresponds to a specific non-I-frame in a specific GOP of a specific primary image stream generated from specific image data captured by the specific camera, transmitting, to the recipient decoding device, a specific reconstructed I-frame from a specific secondary image stream of reconstructed I-frames in the plurality of secondary image streams, the specific secondary image stream of reconstructed I-frames corresponding to and generated using the specific primary image stream, the specific reconstructed I-frame derived in part from the specific non-I-frame at the specific time point in the specific GOP of the specific primary image stream;

in response to determining that the specific time point corresponds to a specific I-frame in the specific GOP of the specific primary image stream, transmitting, to the recipient decoding device, the specific I-frame; and transmitting, to the recipient decoding device, one or more subsequent non-I-frames in the GOP of the primary image stream.

2. The method of claim 1, further comprising: transmitting, to the recipient decoding device, a second I-frame from the specific secondary image stream immediately after transmitting, to the recipient decoding device, the specific reconstructed I-frame from the specific secondary image stream.

3. The method of claim 1, wherein the specific camera belongs to a subset of cameras selected, based at least in part on the viewer's viewpoint, from among the plurality of cameras; wherein the specific reconstructed I-frame belongs to a subset of I-frames generated from image data captured by the subset of cameras; wherein the subset of I-frames is transmitted to the recipient decoding device.

4. The method of claim 1, wherein the viewer's viewpoint represents one of: the viewer's position, the viewer's orientation, or a combination of the viewer's position and orientation.

5. The method of claim 1, wherein the multi-view image stream is used to support one of: an augmented reality application, a virtual reality application, a cinema video application, a home-based video application, a video streaming application, a cloud-based video application, a Wi-Fi-based video application, a cellular-data-network-based video application, or an immersive video application.

6. A method for rendering video stream data, comprising:
receiving, from an upstream device, video content derived from a subset of image data in a multi-view image stream encoded with a plurality of primary image streams and a plurality of secondary image streams, wherein each primary image stream in the plurality of primary image streams is generated with respective image data captured by a different camera in a plurality of cameras and used to generate a respective secondary image stream in the plurality of secondary image streams, wherein the primary image stream comprises a sequence of single-view images having groups of pictures (GOPs) each of which comprises I-frames and non-I-frames, wherein the respective secondary image stream comprises a sequence of reconstructed I-frames each of which is derived at least in part from a corresponding non-I-frame in a GOP of the primary image stream;

sending, to the upstream device, viewpoint data of a viewer collected in real time while the viewer is viewing the video content, wherein the viewpoint data indicates the viewer's viewpoint has changed starting from a specific time point;

wherein a specific camera is selected, based on the viewer's changed viewpoint, from among a plurality of cameras, wherein a video content portion derived from an image data portion captured by the specific camera is to be rendered in the viewer's viewport after the specific time point;

if the specific time point corresponds to a specific non-I-frame in a specific GOP of a specific primary image stream generated from image data captured by the specific camera, receiving, from the upstream device, a specific reconstructed I-frame from a specific secondary image stream of reconstructed I-frames in the plurality of secondary image streams, the specific secondary image stream of reconstructed I-frames corresponding to and generated using the specific primary image stream, the specific reconstructed I-frame derived in part from the specific non-I-frame at the specific time point in the specific GOP of the specific primary image stream;

if the specific time point corresponds to a specific I-frame in the specific GOP of the specific primary image stream, receiving, from the upstream device, the specific I-frame; and processing and rendering a display image derived from the received I-frame in the viewer's viewport for the specific time point;

wherein a non-I-frame from the GOP of the primary image stream is subsequently received.

7. The method of claim 6, wherein a second display image is derived from the non-I-frame based at least in part on a coding context set up with the I-frame.

8. The method of claim 6, wherein the viewer's viewpoint changes within a viewing volume.

9. The method of claim 6, wherein the viewer's viewpoint represents one of: the viewer's position, the viewer's orientation, or a combination of the viewer's position and orientation.

10. An apparatus comprising a processor and configured to perform any one of the methods recited in claim 1.

11. A non-transitory computer-readable storage medium having stored thereon computer-executable instruction for executing a method with one or more processors in accordance with any of the methods recited in claim 1.

12. An apparatus comprising a processor and configured to perform any one of the methods recited in claim 6.

13. A non-transitory computer-readable storage medium having stored thereon computer-executable instruction for executing a method with one or more processors in accordance with any of the methods recited in claim 6.

* * * * *